United States Patent
Chen et al.

(10) Patent No.: US 9,173,171 B2
(45) Date of Patent: Oct. 27, 2015

(54) PORTABLE DEVICE WITH SUBSCRIBER IDENTITY CARDS AND METHOD FOR CONTROLLING TRANSMISSION POWER THEREOF

(71) Applicant: HTC Corporation, Taoyuan, Taoyuan County (TW)

(72) Inventors: Yueh-Hsiang Chen, Taoyuan (TW); Chung-Cheng Tseng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 169 days.

(21) Appl. No.: 13/895,836

(22) Filed: May 16, 2013

(65) Prior Publication Data

US 2014/0099934 A1 Apr. 10, 2014

Related U.S. Application Data

(60) Provisional application No. 61/710,292, filed on Oct. 5, 2012.

(51) Int. Cl.
*H04W 52/02* (2009.01)

(52) U.S. Cl.
CPC ............ *H04W 52/0261* (2013.01); *Y02B 60/50* (2013.01)

(58) Field of Classification Search
CPC .... Y02B 60/50; H04W 48/18; H04W 76/025; H04W 88/06; H04W 52/0277; H04W 52/028; H04W 72/0453; G06F 11/3062; G06F 1/28; G06F 1/3212; G06F 1/3287; G06F 1/329; H04M 3/42246
USPC ................ 455/418, 13.4, 522, 571, 572, 574, 455/127.1, 127.5
See application file for complete search history.

(56) References Cited

U.S. PATENT DOCUMENTS

| | | | |
|---|---|---|---|
| 2005/0143119 A1 | 6/2005 | Chandra et al. | |
| 2006/0234693 A1* | 10/2006 | Isidore et al. | 455/422.1 |
| 2010/0075716 A1 | 3/2010 | Chang et al. | |
| 2010/0137023 A1* | 6/2010 | Chishima et al. | 455/552.1 |
| 2014/0080459 A1* | 3/2014 | Taha et al. | 455/414.1 |

* cited by examiner

*Primary Examiner* — Chuong A Ngo

(74) *Attorney, Agent, or Firm* — Birch, Stewart, Kolasch & Birch, LLP

(57) ABSTRACT

A portable device is provided. The portable device comprises a first wireless module, a second wireless module, a first subscriber identity card coupled to the first wireless module, a second subscriber identity card coupled to the second wireless module and a battery. The first subscriber identity card camps on a cell via the first wireless module. The second subscriber identity card camps on the same cell or a different cell via the second wireless module. A first transmission power of one of the first and second wireless modules is maintained, and a second transmission power of another one of the first and second wireless modules is dynamically adjusted according to a variation in a voltage of the battery.

13 Claims, 6 Drawing Sheets

| | TX1 | | TX2 | |
|---|---|---|---|---|
| VBAT | Band | Power Level | Band | Power Level |
| >3.8V | EGSM/DCS/PCS | PW1 | EGSM/DCS/PCS | PW1 |
| 3.7V | EGSM/DCS/PCS | PW1 | EGSM/DCS/PCS | PW2 |
| 3.6V | EGSM/DCS/PCS | PW1 | EGSM/DCS/PCS | PW3 |
| 3.5V | EGSM/DCS/PCS | PW1 | EGSM/DCS/PCS | PW4 |
| 3.4V | EGSM/DCS/PCS | PW1 | EGSM/DCS/PCS | PW5 |

|  | TX1 | | TX2 | |
| --- | --- | --- | --- | --- |
| VBAT | Band | Power Level | Band | Power Level |
| >3.8V | EGSM/DCS/PCS | PW1 | EGSM/DCS/PCS | PW1 |
| 3.7V | EGSM/DCS/PCS | PW1 | EGSM/DCS/PCS | PW2 |
| 3.6V | EGSM/DCS/PCS | PW1 | EGSM/DCS/PCS | PW3 |
| 3.5V | EGSM/DCS/PCS | PW1 | EGSM/DCS/PCS | PW4 |
| 3.4V | EGSM/DCS/PCS | PW1 | EGSM/DCS/PCS | PW5 |

FIG. 4

PORTABLE DEVICE WITH SUBSCRIBER IDENTITY CARDS AND METHOD FOR CONTROLLING TRANSMISSION POWER THEREOF

CROSS REFERENCE TO RELATED APPLICATIONS

This Application claims priority of U.S. Provisional Application No. 61/710,292, filed on Oct. 5, 2012, the entirety of which is incorporated by reference herein.

BACKGROUND OF THE INVENTION

1. Field of the Invention

The invention relates to a method for controlling transmission power, and more particularly, to a method for controlling transmission power of a portable device with multiple subscriber identity cards.

2. Description of the Related Art

Currently, the Global System for Mobile communication (GSM) standard is the popular standard for mobile phones in the world. The GSM standard, standardized by the European Telecommunication Standards Institute (ETSI) is a cellular network structure and a Time Division Multiple Access (TDMA) system. For a carrier frequency, the TDMA system will divide a frame into eight time slots, wherein each time slot is used to transmit a channel data for a subscriber. In addition, the General Packet Radio Service (GPRS) technology is one of the available technologies of a GSM system. The GPRS technology utilizes the unused channels in the GSM system to provide moderate speed data transmission. The Wideband Code Division Multiple Access (W-CDMA) is a wideband spread-spectrum mobile air interface that utilizes the direct-sequence spread spectrum method of asynchronous code division multiple access to achieve higher speeds and support more users when compared to the implementation of time division multiplexing (TDMA) used by GSM systems. Time Division-Synchronous Code Division Multiple Access (TD-SCDMA) is another type of 3G mobile telecommunications standard.

A dual SIM mobile phone is a phone with two Subscriber Identity Modules (SIMs), which correspond to different telephone numbers. The dual SIM mobile phone allows a user to use two communication services without carrying two phones at the same time. For example, the same mobile phone may be used for business and private use with separate numbers and bills, thus providing convenience to mobile phone users.

However, when operating in a dual SIM dual active (DSDA) mode, battery power will dissipate quickly due to high power consumption.

BRIEF SUMMARY OF THE INVENTION

Portable devices and methods for controlling transmission power of a portable device are provided. An embodiment of a portable device is provided. The portable device comprises: a first wireless module; a second wireless module; a first subscriber identity card coupled to the first wireless module, camping on a cell via the first wireless module; a second subscriber identity card coupled to the second wireless module, camping on the same cell or a different cell via the second wireless module; and a battery. A first transmission power of one of the first and second wireless modules is maintained, and a second transmission power of another one of the first and second wireless modules is dynamically adjusted according to a variation in a voltage of the battery.

Furthermore, an embodiment of a method for controlling transmission power of a portable device is provided. The portable device comprises a battery, a first wireless module camping on a cell with a first subscriber identity card, and a second wireless module camping on the same cell or a different cell with a second subscriber identity card. A voltage of the battery is detected when first and second communication services are provided by the portable device via the first and second subscriber identity cards, respectively. A slave wireless module between the first and second wireless modules is determined according to the communication services. A transmission power of the slave wireless module is dynamically adjusted according to the detected voltage of the battery.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 4 shows a table illustrating a relationship between the voltage VBAT of the battery and the transmission power TX1 and TX2;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

A subscriber identity module (SIM) card typically contains user account information, an international mobile subscriber identity (IMSI) and a set of SIM application toolkit (SAT) commands and provides storage space for phone book contacts. A micro-processing unit (MCU) of the Baseband chip (simply referred to as a Baseband MCU hereinafter) may interact with MCUs of the SIM cards (each simply referred to as a SIM MCU hereinafter) to fetch data or SAT commands from the plugged in SIM cards. A mobile station (MS) is immediately programmed after plugging in the SIM card thereto. SIM cards may also be programmed to display custom menus for personalized services.

A universal SIM (USIM) card is inserted into a mobile station for Wideband Code Division Multiple Access (W-CDMA) or Time Division-Synchronous Code Division Multiple Access (TD-SCDMA) system (also called 3G) telephony communication. The USIM card stores user account information, an IMSI, authentication information and a set of USIM Application Toolkit (USAT) commands and provides storage space for text messages and phone book contacts. A Baseband MCU may interact with an MCU of the USIM card (each simply referred to as a USIM MCU hereinafter) to fetch data or SAT commands from the plugged in USIM cards. The phone book on the USIM card is greatly enhanced when compared to the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in the UMTS. A mobile station is immediately programmed after plugging in the USIM card thereto.

A removable User Identity Module (R-UIM) or a Code Division Multiple Access (CDMA) Subscriber Identity Module (CSIM) card has already been developed for a CDMA mobile station and is equivalent to the GSM SIM and 3G USIM except that it is capable of working in CDMA networks. The R-UIM or the CSIM card is physically compatible with the GSM SIM card, and provides similar security mechanisms for the CDMA system.

Figure 1:
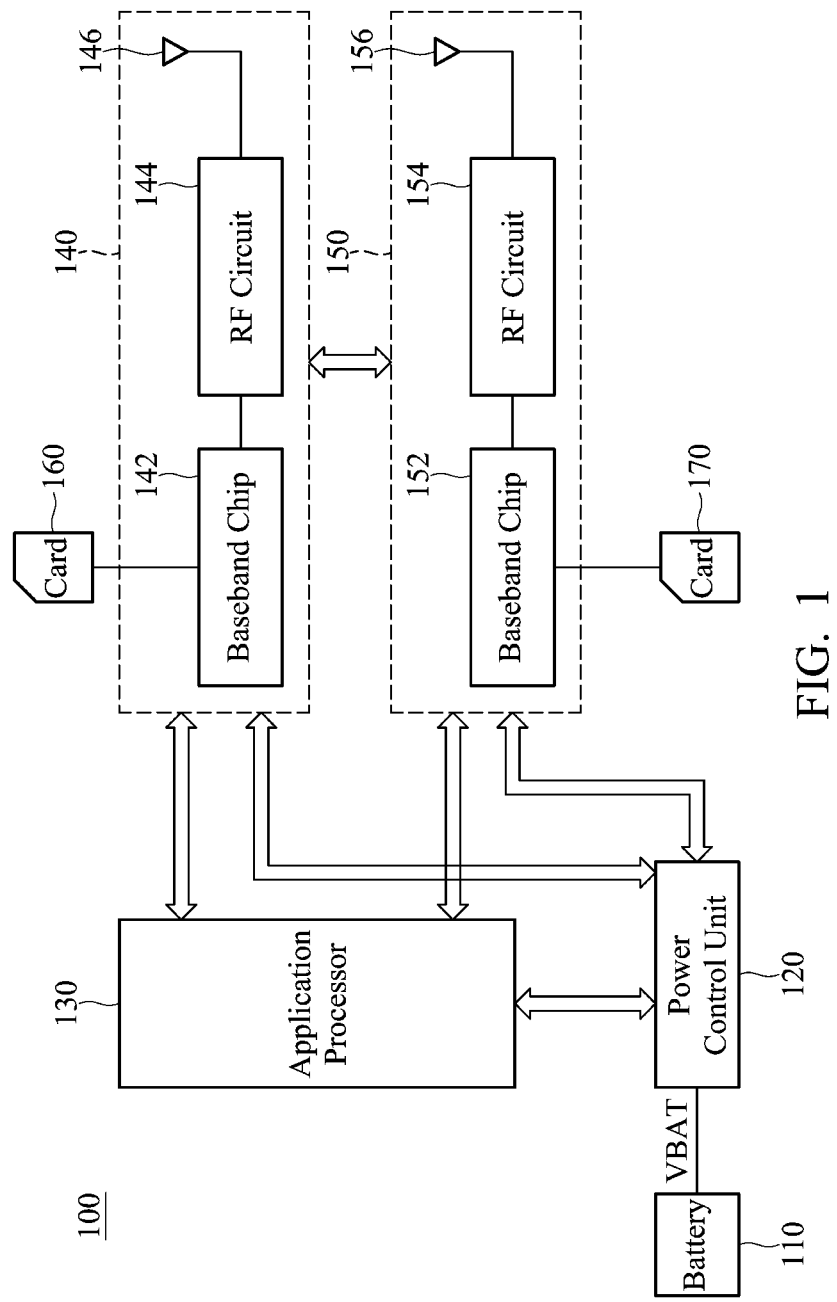
FIG. 1 shows a portable device according to an embodiment of the invention.

FIG. 1 shows a portable device 100 according to an embodiment of the invention. The portable device 100 comprises a battery 110, a power control unit 120, an application processor 130 and two wireless modules 140 and 150. The wireless module 140 comprises a Baseband chip 142, a radio frequency (RF) circuit 144 and an antenna 146, and the wireless module 150 comprises a Baseband chip 152, a RF circuit 154 and an antenna 156. Two subscriber identity cards 160 and 170 are plugged into two sockets of the mobile station 100 connecting to the wireless modules 140 and 150 respectively, wherein the subscriber identity cards 160 and 170 separately uses the RF circuits 144 and 154 to transmit signals to or receive signals from their camped on cell or neighboring cells. Each of the subscriber identity cards 160 and 170 may be a SIM, USIM, R-UIM or CSIM card, which is provided by a particular network operator. The mobile station 100 can therefore simultaneously camp on two cells provided by either the same network operator or different network operators for the subscriber identity cards 160 and 170, using different RF circuits and antennas. In one embodiment, the Baseband chip 142 comprises a processor for controlling the communications between the subscriber identity cards 160 and 170 and the RF circuits 144 and 154. In one embodiment, a further processor may be provided in the Baseband chip 152 to coordinately operate with the processor of the Baseband chip 142 to improve performance. In one embodiment, the Baseband chips 142 and 152 can be implemented in the same integrated circuit (IC).

In FIG. 1, each of the RF circuits 144 and 154 receives wireless radio frequency signals and converts the received signals to baseband signals to be processed by the corresponding Baseband chips 142 and 152, or receives baseband signals from the corresponding Baseband chip 142 and 152 and converts the received signals to wireless radio frequency signals to be transmitted to a peer device. Each of the RF circuits 144 and 154 may comprise a plurality of hardware devices to perform radio frequency conversion. For example, each of the RF circuits 144 and 154 may comprise a mixer to multiply the Baseband signals with a carrier oscillated in the radio frequency of the wireless communication system, wherein the radio frequency may be, for example, 850 MHz, 900 MHz or 1800 MHz for a global system for mobile communication (GSM), or 1900 MHz or 2100 MHz for a Universal Mobile Telecommunications System (UMTS). Furthermore, each Baseband chip further converts the baseband signals to a plurality of digital signals, and processes the digital signals, and vice versa. The Baseband chip may also comprise a plurality of hardware devices to perform Baseband signal processing. The Baseband signal processing may comprise analog to digital conversion (ADC), digital to analog conversion (DAC), gain adjustments, modulation/demodulation, encoding/decoding, and so on.

In FIG. 1, the power control unit 120 provides a plurality of operating voltages (e.g. 1.2V, 3.3V and so on) to the application processor 130 and the wireless modules 140 and 150 according to a voltage VBAT of the battery 110. Furthermore, the power control unit 120 further detects a voltage level of the voltage VBAT and provides information regarding the detected voltage level of the voltage VBAT to the application processor 130 and the wireless modules 140 and 150. Therefore, if the detected voltage level of the voltage VBAT is decreased, the power control unit 120 will notify the application processor 130. Next, the application processor 130 controls a slave wireless module of the wireless modules 140 and 150, to decrease a transmission power of the slave wireless module, thus, decreasing power consumption and avoiding abrupt shutdowns due to battery power dissipation.

In one embodiment, the wireless module 140 and the wireless module 150 can communicate with each other via a specific interface, e.g. UART, SPI and so on. For example, the wireless module 140 and the wireless module 150 can notify each other about information regarding transmission slots thereof. Thus, according to the information regarding the detected voltage level of the voltage VBAT from the power control unit 120, a master wireless module of the wireless modules 140 and 150 can control the slave wireless module to decrease the transmission power of the slave wireless module.

Figure 2:
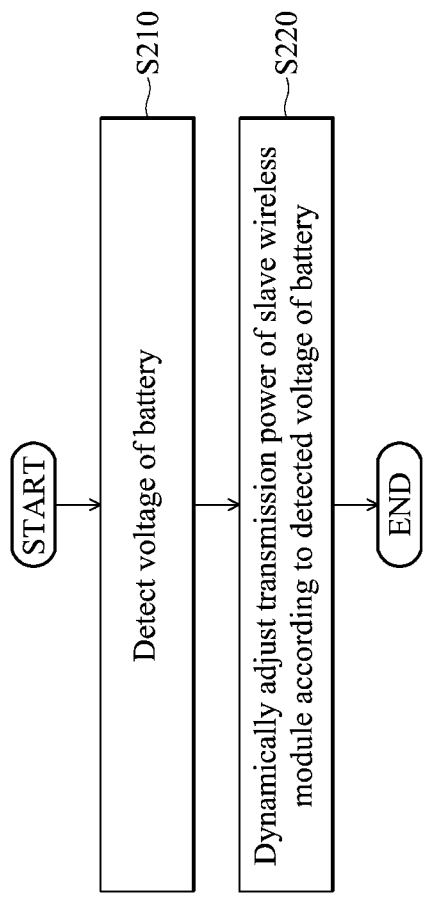
FIG. 2 shows a method for controlling transmission power of a portable device according to an embodiment of the invention.

FIG. 2 shows a method for controlling transmission power of a portable device according to an embodiment of the invention. The portable device comprises first and second subscriber identity cards (e.g. 160 and 170 of FIG. 1) and first and second wireless modules (e.g. 140 and 150 of FIG. 1), wherein the first and second subscriber identity cards may camp on the same cell or different cells. First, in step S210, a voltage (e.g. VBAT of FIG. 1) of a battery is detected in the portable device when two communication services are provided via the first and second subscriber identity cards, respectively. Next, in step S220, a transmission power of a slave wireless module of the first and second wireless modules is dynamically adjusted according to the detected voltage of the battery, wherein which is the slave wireless module between the first and second wireless modules is determined according to the communication service of the corresponding subscriber identity card. For example, the portable device may make a previous call with the first subscriber identity card to provide a first communication service. When the previous call is being made, the portable device may make a following call with the second subscriber identity card to provide a first communication service. Thus, the portable device defines that the slave wireless module is the second wireless module corresponding to the second subscriber identity card. Therefore, when two voice calls are made in the portable device, the transmission power of the slave wireless module corresponding to a subscriber identity card that is used to make the later call, is adjusted according to the detected voltage of the battery. If the detected voltage of the battery decreases, the transmission power of the slave wireless module decreases. If the detected voltage of the battery increases, the transmission power of the slave wireless module increases. In one embodiment, the portable device may exchange data packets with the first subscriber identity card to provide a first communication service. Simultaneously, the portable device may make a voice call with the second subscriber identity card to provide a second communication service. Thus, the portable device defines that the slave wireless modules is the first wireless module corresponding to the first subscriber identity card. Therefore, the transmission power of the slave wireless module corresponding to a subscriber identity card that is used to transmit data packets is adjusted according to the detected voltage of the battery. Similarly, if the detected voltage of the battery decreases, the transmission power of the slave wireless module decreases. If the detected voltage of the battery increases, the transmission power of the slave wireless module increases.

Figure 3:
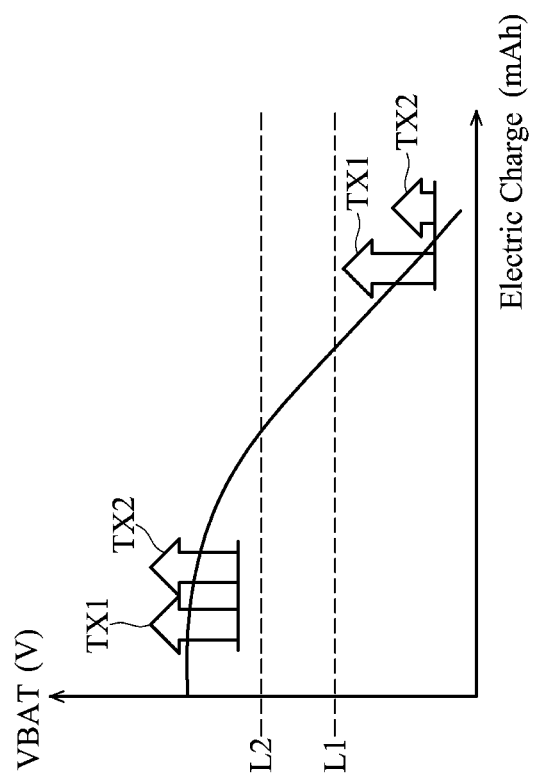
FIG. 3 shows a schematic illustrating a variation in transmission power of a slave wireless module.

FIG. 3 shows a schematic illustrating a variation in transmission power of a slave wireless module. In FIG. 3, label TX2 represents the transmission power of the slave wireless module, and label TX1 represents a transmission power of a master wireless module. If the voltage of the battery is decreased below a voltage level L1, the portable device controls the master wireless module to maintain the transmission power TX1 and controls the slave wireless module to decrease the transmission power TX2. When the transmission power TX2 is decreased, the voltage of the battery may be increased slightly. Therefore, a hysteresis manner is used to avoid jitter in the voltage of the battery, wherein the jitter is caused when the transmission power TX2 is increased and decreased repeatedly when the voltage of the battery is increased and decreased slightly. Therefore, once the voltage of the battery exceeds a voltage level L2, the portable device controls the slave wireless module to increase or regain the transmission power TX2. In one embodiment, If the voltage of the battery is decreased below the voltage level L1, the portable device controls the master wireless module to decrease the transmission power TX1 from a first power level to a second power level, and controls the slave wireless module to decrease the transmission power TX2 from the first power level to a third power level, wherein the third power level is smaller than the second power level. In the embodiment, the second and third power levels are determined according to quality of service (QoS) of the corresponding wireless module.

FIG. 4 shows a table illustrating a relationship between the voltage VBAT of the battery and the transmission power TX1 and TX2. In FIG. 4, if the voltage VBAT of the battery is larger than 3.8V, the transmission power TX1 and the transmission power TX2 are set to a level PW1. If the voltage VBAT of the battery is decreased below 3.8V, the transmission power TX1 is still maintained at the level PW1, and the transmission power TX2 is set to a level PW2 (PW2≤PW1). If the voltage VBAT of the battery is decreased below 3.7V, the transmission power TX1 is still maintained at the level PW1, and the transmission power TX2 is set to a level PW3 (PW3<PW2). If the voltage VBAT of the battery is decreased below 3.6V, the transmission power TX1 is still maintained at the level PW1, and the transmission power TX2 is set to a level PW4 (PW4<PW3). If the voltage VBAT of the battery is decreased below 3.5V, the transmission power TX1 is still maintained at the level PW1, and the transmission power TX2 is set to a level PW5 (PW5<PW4). As described above, a hysteresis voltage Vhys is used to avoid jitter in the voltage of the battery caused by the adjustments of the transmission power TX2. For example, if the voltage VBAT of the battery is increased to be above 3.6V+Vhys, the transmission power TX2 is changed to the level PW2 from the level PW3. In FIG. 4, Extended GSM (E-GSM), DCS (Digital Cellular Service) and Personal Communication Service (PCS) are used as an example, and does not limit the invention. In another word, dynamically adjusting the transmission power TX2 can be applied to any frequency band in GSM system. Furthermore, it is to be noted that the values of the voltage VBAT (e.g. 3.8V, 3.7V, 3.6V, 3.5V and 3.4V) are used as an example, and does not limit the invention. The values of the voltage VBAT can be determined according to actual applications.

Figure 5:
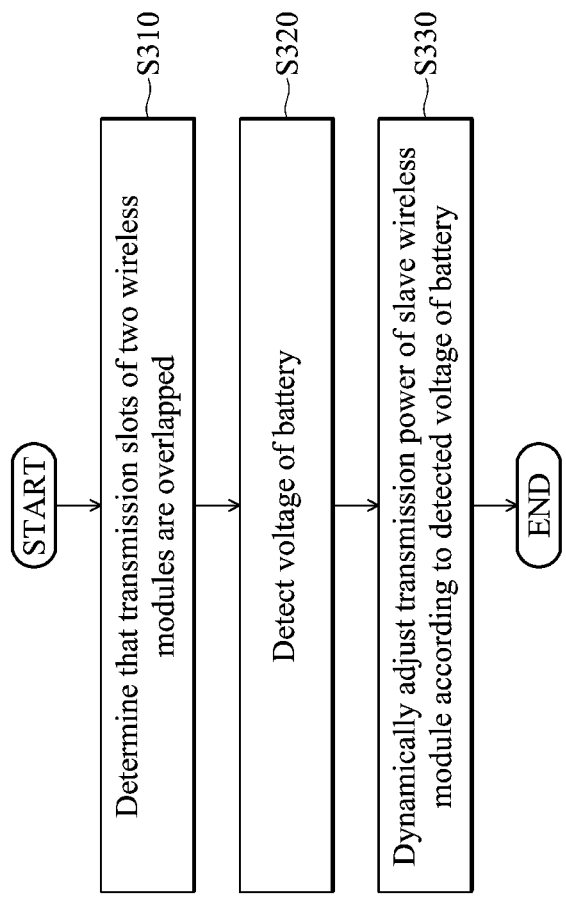
FIG. 5 shows a method for controlling transmission power of a portable device according to another embodiment of the invention.
Figure 6A:
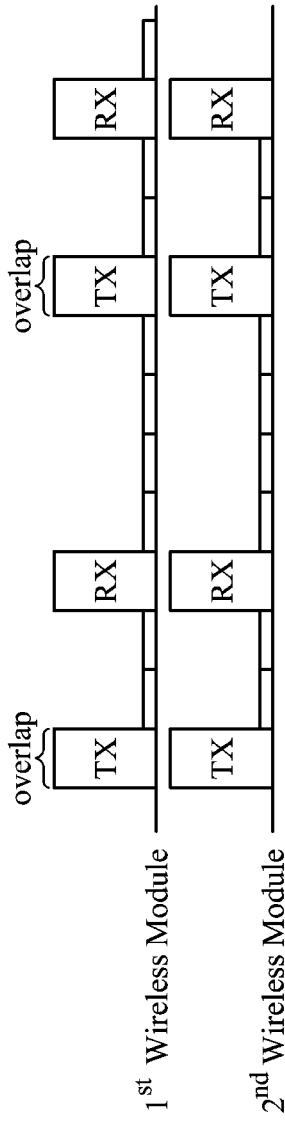
FIG. 6A shows a schematic illustrating that transmission slots of the first and second wireless modules are overlapped.
Figure 6B:
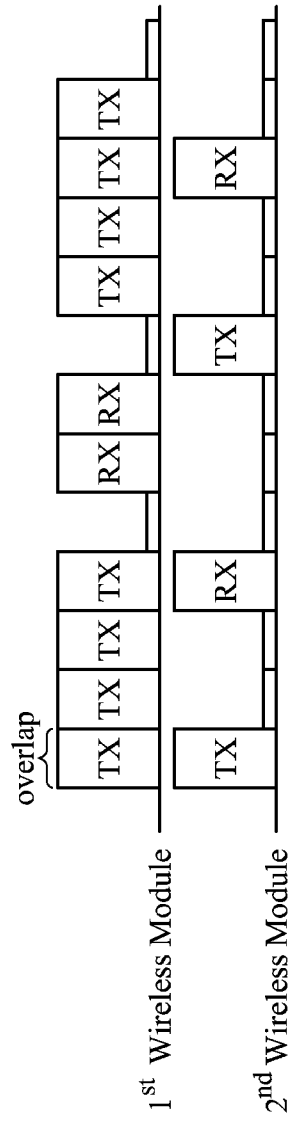
FIG. 6B shows another schematic illustrating that transmission slots of the first and second wireless modules are overlapped.

FIG. 5 shows a method for controlling transmission power of a portable device according to another embodiment of the invention. The portable device comprises first and second subscriber identity cards (e.g. 160 and 170 of FIG. 1) and first and second wireless modules (e.g. 140 and 150 of FIG. 1), wherein the first and second subscriber identity cards may camp on the same cell or different cells. First, in step S310, the portable device determines that a transmission slot of the first wireless module and a transmission slot of the second wireless module are overlapped when two communication services are provided via the first and second subscriber identity cards, respectively, as shown in FIG. 6A and FIG. 6B. Next, in step S320, a voltage (e.g. VBAT of FIG. 1) of a battery is detected in the portable device. Next, in step S330, a transmission power of a slave wireless module of the first and second wireless modules is dynamically adjusted according to the detected voltage of the battery, wherein the slave wireless module is determined according to the communication service of the corresponding subscriber identity card. For example, the portable device may make a previous call with the first subscriber identity card, and then may make a following call with the second subscriber identity card when the previous call is being made. Thus, the portable device defines that the slave wireless module is the second wireless module corresponding to the second subscriber identity card. Therefore, when two voice calls are made in the portable device, the transmission power of the slave wireless module corresponding to a subscriber identity card that is used to make the later call is adjusted according to the detected voltage of the battery. If the detected voltage of the battery decreases, the transmission power of the slave wireless module decreases. If the detected voltage of the battery increases, the transmission power of the slave wireless module increases. As described above, a hysteresis manner is used to avoid jitter in the voltage of the battery. In one embodiment, the portable device may exchange data packets with the first subscriber identity card and make a voice call with the second subscriber identity card simultaneously. Thus, the portable device defines that the slave wireless modules is the first wireless module corresponding to the first subscriber identity card. Therefore, the transmission power of the slave wireless module corresponding to a subscriber identity card that is used to transmit data packets is adjusted according to the detected voltage of the battery. Similarly, if the detected voltage of the battery decreases, the transmission power of the slave wireless module decreases. If the detected voltage of the battery increases, the transmission power of the slave wireless module increases.

In a DSDA mode of a dual SIM portable device, especially in communication services of the $2^{nd}$ generation mobile telecommunications (2G) standard, power consumption is decreased by decreasing a transmission power of a slave wireless module according to the embodiments. Furthermore, for the $3^{rd}$ generation mobile telecommunications (3G) standard, specific absorption rate (SAR) is also improved by decreasing a transmission power of a slave wireless module according to the embodiments.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable device, comprising:
a first wireless module;
a second wireless module;
a first subscriber identity card coupled to the first wireless module, camping on a cell via the first wireless module;
a second subscriber identity card coupled to the second wireless module, camping on the same cell or a different cell via the second wireless module; and
a battery,
wherein a first transmission power of one of the first and second wireless modules is maintained, and a second transmission power of another one of the first and second wireless modules is dynamically adjusted according to a variation in a voltage of the battery, and
wherein when the voltage of the battery is regained, the second transmission power is increased.

2. The portable device as claimed in claim 1, further comprising:
a processor coupled to the first and second wireless modules, making a first call with the first subscriber identity card according to the first transmission power and making a second call with the second subscriber identity card according to the second transmission power, wherein the first call is made prior to the second call,
wherein when the voltage of the battery is smaller than a first threshold, the processor controls the second wireless module to decrease the second transmission power of the second wireless module, and
wherein when the voltage of the battery is larger than a second threshold, the processor controls the second wireless module to increase the decreased second transmission power of the second wireless module, and a voltage level of the second threshold is larger than that of the first threshold.

3. The portable device as claimed in claim 1, further comprising:
a processor coupled to the first and second wireless modules, making a call with the first subscriber identity card according to the first transmission power and exchanging data packets with the second subscriber identity card according to the second transmission power,
wherein when the voltage of the battery is smaller than a first threshold, the processor controls the second wireless module to decrease the second transmission power of the second wireless module, and
wherein when the voltage of the battery is larger than a second threshold, the processor controls the second wireless module to increase the decreased second transmission power, and a voltage level of the second threshold is larger than that of the first threshold.

4. The portable device as claimed in claim 1, further comprising:
a processor coupled to the first and second wireless modules, making a first call with the first subscriber identity card according to the first transmission power and making a second call with the second subscriber identity card according to the second transmission power, wherein the first call is made prior to the second call,
wherein when the voltage of the battery is smaller than a first threshold and the transmission slots of the first and second wireless modules are overlapped, the processor controls the second wireless module to decrease the second transmission power of the second wireless module, and
wherein when the voltage of the battery is larger than a second threshold and the transmission slots of the first and second wireless modules are overlapped, the processor controls the second wireless module to increase the decreased second transmission power of the second wireless module, and a voltage level of the second threshold is larger than that of the first threshold.

5. The portable device as claimed in claim 1, further comprising:
a processor coupled to the first and second wireless modules, making a first call with the first subscriber identity card according to the first transmission power and exchanging data packets with the second subscriber identity card according to the second transmission power,
wherein when the voltage of the battery is smaller than a first threshold and the transmission slots of the first and second wireless modules are overlapped, the processor controls the second wireless module to decrease the second transmission power of the second wireless module, and
wherein when the voltage of the battery is larger than a second threshold and the transmission slots of the first and second wireless modules are overlapped, the processor controls the second wireless module to increase the decreased second transmission power of the second wireless module, and a voltage level of the second threshold is larger than that of the first threshold.

6. The portable device as claimed in claim 1, wherein a first call is made with the first wireless module according to the first transmission power, and when the first call is made, a second call is made with the second wireless module or data packets are exchanged with the second wireless module according to the second transmission power, wherein the first call is made prior to the second call.

7. The portable device as claimed in claim 6, wherein when the voltage of the battery is smaller than a first threshold, the first wireless module notifies the second wireless module to decrease the second transmission power of the second wireless module, and when the voltage of the battery is larger than a second threshold, the first wireless module notifies the second wireless module to increase the decreased second transmission power of the second wireless module, wherein the second threshold is larger than the first threshold.

8. The portable device as claimed in claim 6, wherein when the voltage of the battery is smaller than a first threshold and the transmission slots of the first and second wireless modules are overlapped, the first wireless module notifies the second wireless module to decrease the second transmission power of the second wireless module, and when the voltage of the battery is larger than a second threshold and the transmission slots of the first and second wireless modules are overlapped, the first wireless module notifies the second wireless module to increase the decreased second transmission power of the second wireless module, wherein the second threshold is larger than the first threshold.

9. A method for controlling transmission power of a portable device, wherein the portable device comprises a battery, a first wireless module camping on a cell with a first subscriber identity card, and a second wireless module camping on the same cell or a different cell with a second subscriber identity card, comprising:
- detecting a voltage of the battery when first and second communication services are provided by the portable device via the first and second subscriber identity cards, respectively;
- determining a slave wireless module between the first and second wireless modules according to the communication services; and
- dynamically adjusting a transmission power of the slave wireless module according to the detected voltage of the battery,
- wherein when the detected voltage of the battery is regained, the transmission power of the slave wireless module is increased and a transmission power of a master wireless module between the first and second wireless modules is maintained.

10. The method as claimed in claim 9, further comprising:
- making a first call with the first subscriber identity card to provide the first communication service; and
- when the first call is made, making a second call with the second subscriber identity card to provide the second communication service,
- wherein the step of dynamically adjusting the transmission power of the slave wireless modules according to the detected voltage of the battery further comprises:
- decreasing the transmission power of the slave wireless module when the detected voltage of the battery is smaller than a first threshold; and
- increasing the decreased transmission power of the slave wireless module when the detected voltage of the battery is larger than a second threshold, and
- wherein the second threshold is larger than the first threshold, and the slave wireless module is the second wireless module.

11. The method as claimed in claim 9, further comprising:
- making a call with the first subscriber identity card to provide the first communication service; and
- when the first call is made, exchanging data packets with the second subscriber identity card to provide the second communication service,
- wherein the step of dynamically adjusting the transmission power of the slave wireless modules according to the detected voltage of the battery further comprises:
- decreasing the transmission power of the slave wireless module when the detected voltage of the battery is smaller than a first threshold; and
- increasing the decreased transmission power of the slave wireless module when the detected voltage of the battery is larger than a second threshold, and
- wherein the second threshold is larger than the first threshold, and the slave wireless module is the second wireless module.

12. The method as claimed in claim 9, further comprising:
- making a first call with the first subscriber identity card to provide the first communication service;
- when the first call is made, making a second call with the second subscriber identity card to provide the second communication service; and
- determining whether the transmission slots of the first and second wireless modules are overlapped,
- wherein the step of dynamically adjusting the transmission power of the slave wireless modules according to the detected voltage of the battery further comprises:
- decreasing the transmission power of the slave wireless module when the detected voltage of the battery is smaller than a first threshold and the transmission slots of the first and second wireless modules are overlapped; and
- increasing the decreased transmission power of the slave wireless module when the detected voltage of the battery is larger than a second threshold and the transmission slots of the first and second wireless modules are overlapped,
- wherein the second threshold is larger than the first threshold, and the slave wireless module is the second wireless module.

13. The method as claimed in claim 9, further comprising:
- making a call with the first subscriber identity card to provide the first communication service;
- when the first call is made, exchanging data packets with the second subscriber identity card to provide the second communication service; and
- determining whether the transmission slots of the first and second wireless modules are overlapped,
- wherein the step of dynamically adjusting the transmission power of the slave wireless modules according to the detected voltage of the battery further comprises:
- decreasing the transmission power of the slave wireless module when the detected voltage of the battery is smaller than a first threshold and the transmission slots of the first and second wireless modules are overlapped; and
- increasing the decreased transmission power of the slave wireless module when the detected voltage of the battery is larger than a second threshold and the transmission slots of the first and second wireless modules are overlapped,
- wherein the second threshold is larger than the first threshold, and the slave wireless module is the second wireless module.

* * * * *